United States Patent
McIlvenna

(10) Patent No.: US 10,765,089 B2
(45) Date of Patent: Sep. 8, 2020

(54) MODULAR DOG TOY

(71) Applicant: James McIlvenna, Dublin (IE)

(72) Inventor: James McIlvenna, Dublin (IE)

( * ) Notice: Subject to any disclaimer, the term of this patent is extended or adjusted under 35 U.S.C. 154(b) by 230 days.

(21) Appl. No.: 16/072,608

(22) PCT Filed: Feb. 10, 2017

(86) PCT No.: PCT/EP2017/053064
§ 371 (c)(1),
(2) Date: Jul. 25, 2018

(87) PCT Pub. No.: WO2017/137598
PCT Pub. Date: Aug. 17, 2017

(65) Prior Publication Data
US 2019/0000040 A1     Jan. 3, 2019

(30) Foreign Application Priority Data
Feb. 10, 2016   (GB) .................... 1602403.6

(51) Int. Cl.
*A01K 15/02*    (2006.01)
*A01K 5/01*     (2006.01)
*A44B 17/00*    (2006.01)

(52) U.S. Cl.
CPC .......... *A01K 15/026* (2013.01); *A01K 5/0114* (2013.01); *A01K 15/025* (2013.01);
(Continued)

(58) Field of Classification Search
CPC ... A01K 5/0114; A01K 15/025; A01K 15/026
See application file for complete search history.

(56) References Cited

U.S. PATENT DOCUMENTS 7,832,362 B2 * 11/2010 DeGhionno ......... A01K 15/025
                                                    119/707
8,904,966 B2 * 12/2014 Kolozsvari .......... A01K 15/026
                                                    119/710
(Continued)

FOREIGN PATENT DOCUMENTS

CN      203897018 U     10/2014
WO      2009039153 A1   3/2009

OTHER PUBLICATIONS

Up Dog Toys, 2015, "The Odin", updogtoys.com [online], http://web.archive.org/weg/20151225223949/http://www.updogtoys.com[Accessed Jul. 19, 2016].
(Continued)

*Primary Examiner* — Monica L Barlow
(74) *Attorney, Agent, or Firm* — Snell & Wilmer LLP; Kent A. Lembke

(57) ABSTRACT

This invention relates to a modular dog toy comprising three disparately sized and shaped components, each having a hollow cavity for the reception of foodstuffs. The components each comprise a male connector and a female connector. One of the components has at least one additional connector about its surface. These three disparate components may be connected in a variety of different configurations to modify the difficulty of obtaining the food for the dog. This allows the modular dog toy to be tailored to suit the requirements and physical abilities of the dog.

19 Claims, 19 Drawing Sheets

(52) U.S. Cl.
CPC ........ *A44B 17/007* (2013.01); *A44B 17/0023* (2013.01); *A44B 17/0029* (2013.01); *A44B 17/0041* (2013.01)

(56) References Cited

U.S. PATENT DOCUMENTS

| | | | |
|---|---|---|---|
| 8,904,967 B2 * | 12/2014 | Reiss | A01K 15/025 |
| | | | 119/710 |
| 2004/0200434 A1 | 10/2004 | Shatoff et al. | |
| 2005/0120973 A1 | 6/2005 | St. Pierre | |

OTHER PUBLICATIONS

GB Search Report, Application No. GB1602403.6, dated Jul. 20, 2016.
PCT International Search Report for International Application No. PCT/EP2017/053064, dated Apr. 27, 2017.

* cited by examiner

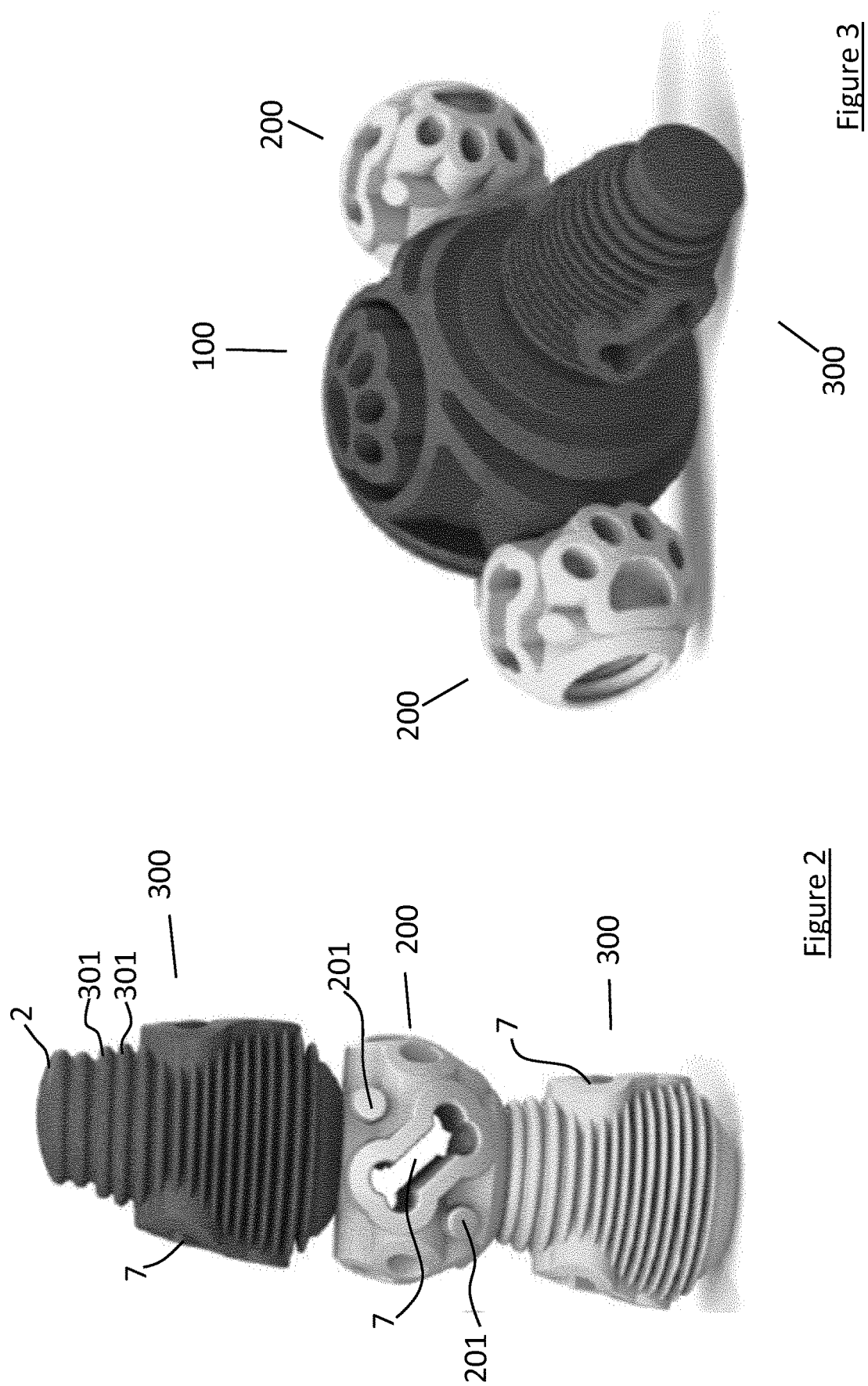

MODULAR DOG TOY

TECHNICAL FIELD

This invention relates to a modular dog toy formed from a resiliently deformable material.

BACKGROUND ART

In nature, dogs must scavenge or hunt for their food. These activities take up a lot of their time and involve physical exertion such as roaming large areas, chasing and digging; problem-solving; use of their senses of hearing, taste and smell; and social coordination. It is felt that providing food in a simple bowl for pet dogs goes against their fundamental nature by removing a major source of stimulation in their lives. Furthermore, it encourages overeating as dogs do not tend to stop eating when they are full. A recent increase in obesity among pet dogs has created a need for humane methods to reduce the amount of food a dog eats. One such method is to make eating more challenging for the dog by placing dry dog food in a dog toy which will slowly dispense the dog food if shaken or upended. The dog must then work to get the food out of the toy. This slows down the eating so that the meal time lasts longer and the dog eats less. It also challenges the dog mentally and physically.

However, it is necessary that the challenge is of appropriate difficulty. If the food is too difficult to obtain the dog may become frustrated and may not eat enough. If the food is too easy to obtain the dog will not be entertained or stimulated enough. Current offerings do not appear to take into account the varying levels of ability depending on the breed of dog. Smaller breeds may find accessing the food too difficult whereas larger breeds may find accessing the food too simple. A "one size fits all" approach is not optimal. Additionally, the dog will learn to get food out of a given dispensing toy so it may become too easy over time. Further problems with these dispensing toys are that they are cumbersome to fill and that more determined dogs occasionally destroy the toy to get the food out.

One type of modular dog toy is that described in US Patent Application Publication No. US2004/0200434 in the name of Shatoff et al. US2004/0200434 describes an animal toy that allows two or more toys to be connected together. The toys may have an internal chamber for holding and ultimately dispensing food.

It is an object of the present invention to provide a modular dog toy for use in dispensing food which overcomes at least one of the above-mentioned deficiencies and to provide a useful alternative to the consumer.

SUMMARY OF INVENTION

According to the invention there is provided a modular dog toy comprising three disparately sized and shaped components, each of these three components having a male connector and a female connector spaced apart about their surface for engagement of one of the other components; each of the three components having an internal cavity for reception of a foodstuff and a charging aperture in communication with the internal cavity providing access to the cavity, and in which: the three components further comprise a main component and a pair of auxiliary components, the main component having at least one additional connector spaced apart from the other connectors about its surface and in which the male connector has a plurality of collars surrounding the connector spaced apart from each other and the female connector has a plurality of inwardly depending flanges spaced apart from each other, and in which at least one of the plurality of collars and the plurality of inwardly depending flanges are saw-tooth shaped.

By having such a modular dog toy, the components can be assembled in various different configurations which require the dog to use different techniques to get the food out of the aperture and to pull the pieces apart. By changing the configuration, an increasingly physically and mentally challenging task can be provided to the dog which prevents the dog from becoming accustomed to the toy over time. Furthermore, configurations which suit differently sized dogs are also possible. For example, it is more difficult to separate two small components than it is to separate a large component from a small component due to the lack of leverage available on small components. It is envisaged that entire meals could be fed to the dog with this toy, as well as treats.

Furthermore, by having a plurality of complementary collars and flanges, this enables each connector to engage with its complementary connector at varying depths, allowing for stronger or weaker connections to be made, which may be chosen to suit a particular dog. By having at least one, and preferably both of the collars and the flanges saw-tooth shaped, the complementary connectors will be configured to facilitate insertion of the male connector in the female connector and prevent inadvertent withdrawal of the male connector from the female connector. This will make it easier for the owner to construct the modular dog toy while at the same time increasing the difficulty for the dog to separate the components and allowing the toy to be thrown without inadvertent separation of the components.

In one embodiment of the invention there is provided a modular dog toy in which one of the auxiliary components is substantially spherically shaped and has a diameter of between 0.065 m and 0.070 m. By having an auxiliary component that is substantially spherically shaped and has a diameter of between 0.065 m and 0.070 m, this will enable the auxiliary component to fit into a tennis ball launcher. A medium or large sized dog will be able to carry the entire component in its mouth and it can be used for a game of fetch, with or without foodstuff. Advantageously, this will reduce the total number of toys required, thereby saving space in the dog owner's dwelling.

In one embodiment of the invention there is provided a modular dog toy in which the substantially spherically shaped component has a diameter of the order of 0.067 m.

In one embodiment of the invention there is provided a modular dog toy in which the substantially spherically shaped auxiliary component has at least one recess formed in its surface.

In one embodiment of the invention there is provided a modular dog toy in which the recess defines an upstanding boss having dimensions smaller than the male connector. This boss may allow a small dog to separate the auxiliary component from another component by allowing the small dog to grip the boss with its teeth or paws. It will also enable a small dog which cannot fit the component into its mouth to carry the component using the boss as a handle.

In one embodiment of the invention there is provided a modular dog toy in which the recess defines a plurality of accessible alcoves for reception of food. These alcoves are smaller than the cavity which makes it more difficult for the dog to completely remove the food.

In one embodiment of the invention there is provided a modular dog toy in which the recess defines the female connector.

In one embodiment of the invention there is provided a modular dog toy in which the male connector and the female connector are diametrically spaced apart from each other about the auxiliary component. This allows for different configurations of dog toy.

In one embodiment of the invention there is provided a modular dog toy in which the main component is substantially spherically shaped and is of the order of twice the diameter of either of the auxiliary components. By having such a main component, the main component will be large enough to enclose a full meal for a dog. The spherical shape will allow the component to roll which makes it more difficult for the dog to manipulate.

In one embodiment of the invention there is provided a modular dog toy in which the main component has a detachable lid for insertion into the charging aperture, the detachable lid having a discharge aperture formed therein. The detachable lid allows the dog toy to be opened for filling and cleaning. It is envisaged that the dog will not be able to remove the lid and thus it provides an easy route of filling the toy with food, without providing an easy way for the dog to get food out. Instead, the dog will have to get the food out though the discharge aperture.

In one embodiment of the invention there is provided a modular dog toy in which there is provided an indent surrounding the discharge aperture.

In one embodiment of the invention there is provided a modular dog toy in which there is provided a cap having an aperture therein, the cap being dimensioned for insertion and retention in the discharge aperture.

In one embodiment of the invention there is provided a modular dog toy in which the discharge aperture is adjustable in size. This feature allows the difficulty level to be adjusted and also allows the toy to be adjusted for larger or smaller chunks of food.

In one embodiment of the invention there is provided a modular dog toy which the lid and the main component each have a complementary helical thread. This is one type of closure that a dog would not be able to open, however it is envisaged that other types of closures could also be employed.

In one embodiment of the invention there is provided a modular dog toy in which the lid has one of a male and a female connector thereon.

In one embodiment of the invention there is provided a modular dog toy in which the additional connector is orthogonal to at least one of the other connectors. This allows configurations of varying difficulty to be constructed from the same components.

In one embodiment of the invention there is provided a modular dog toy in which the main component is elongate and substantially cylindrical in shape, having a male connector at each end, and in which a pair of female connectors are located back to back intermediate the ends of the component. By having a main component that is elongate, the component may be used as a safer alternative to a stick in a game of fetch.

In one embodiment of the invention there is provided a modular dog toy in which the main component comprises at least one aperture intermediate the ends.

In one embodiment of the invention there is provided a modular dog toy in which the aperture comprises a through-bore.

In one embodiment of the invention there is provided a modular dog toy in which the aperture defines the pair of back to back female connectors. By having such an aperture, it is possible to fill the tunnel with food and connect a male connector of an additional auxiliary component to each of the female connectors, thereby making it more challenging for the dog to get to the food within.

In one embodiment of the invention there is provided a modular dog toy in which one of the auxiliary components is substantially frustoconical in shape.

In one embodiment of the invention there is provided a modular dog toy in which the frustoconically shaped auxiliary component has a ribbed surface. This ribbed surface helps to clean the dog's teeth and massage the gums.

In one embodiment of the invention there is provided a modular dog toy in which the base of the frustoconically shaped component comprises the female connector and the apex of the frustoconically shaped component comprises the male connector.

In one embodiment of the invention there is provided a modular dog toy in which one of the auxiliary components is bulb-shaped having a substantially spherical portion. Preferably, the substantially spherical portion has a diameter of between 0.065 m and 0.070 m. Ideally, the substantially spherical portion has a diameter of the order of 0.067 m.

In one embodiment of the invention there is provided a modular dog toy in which the modular dog toy is constructed from one of a thermoplastic elastomer and a thermoplastic rubber. These materials are resiliently deformable, non-toxic, able to withstand chewing and able to bounce off hard surfaces when thrown. These materials are also freezer-safe, which means that food may be frozen into the toy to add another layer of difficulty and enjoyment for the dog.

In one embodiment of the invention there is provided a modular dog toy in which the modular dog toy has a shore A hardness of between 60 and 75. This is a range of hardness which is suitable for both small dogs and large dogs. The toy will be able to withstand prolonged chewing without itself or the dog's teeth or gums becoming damaged.

In one embodiment of the invention there is provided a modular dog toy in which the modular dog toy has a shore A hardness of 70.

BRIEF DESCRIPTION OF THE DRAWINGS

The invention will now be more clearly understood from the following description of some embodiments thereof given by way of example only with reference to the accompanying drawings, in which:—

FIG. 2 is a part of the modular dog toy of FIG. 1;

FIG. 3 is an alternative configuration of the modular dog toy according to the invention;

DETAILED DESCRIPTION OF THE DRAWINGS

Figure 1:
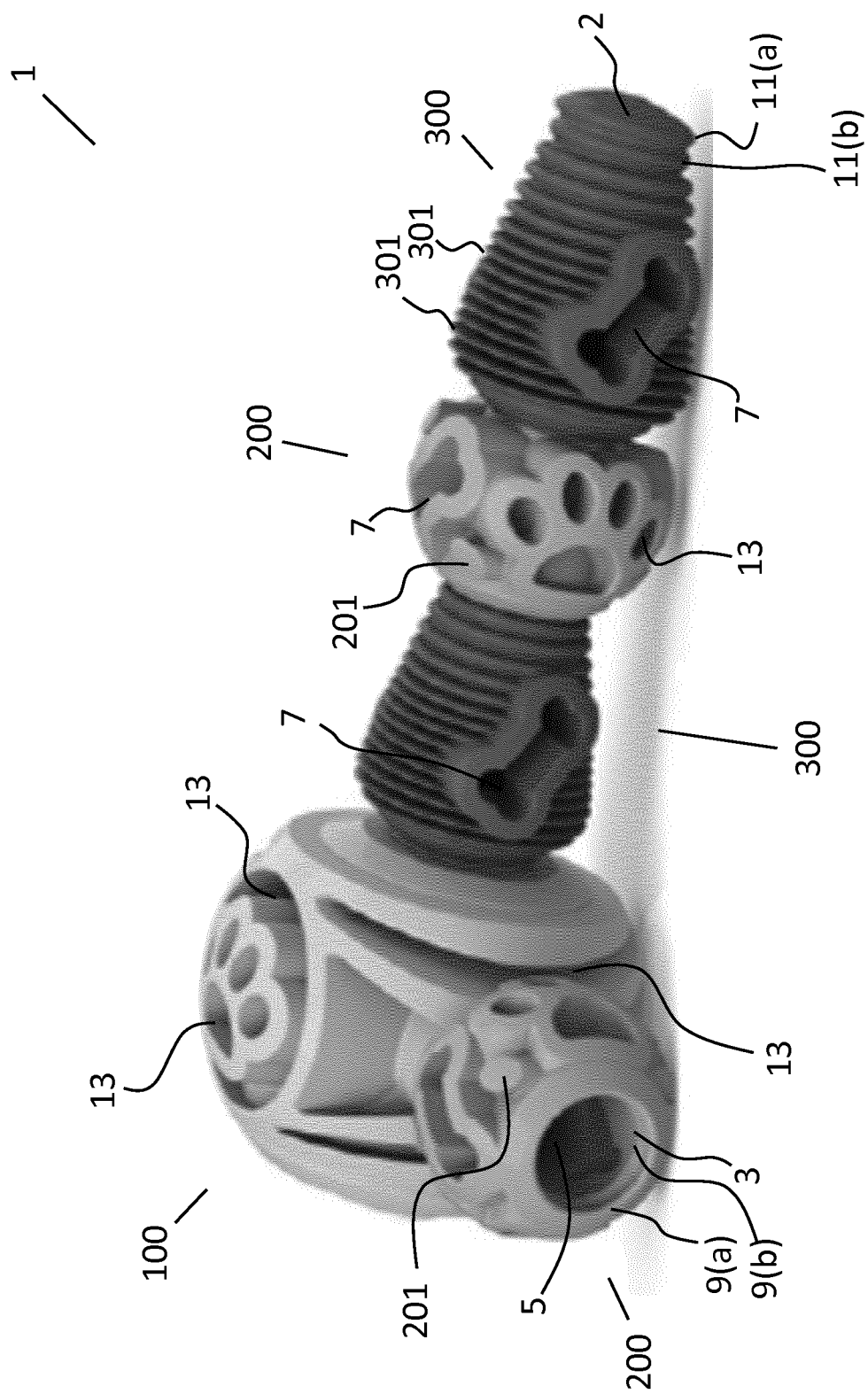
FIG. 1 is a modular dog toy according to the invention.
Figure 4:
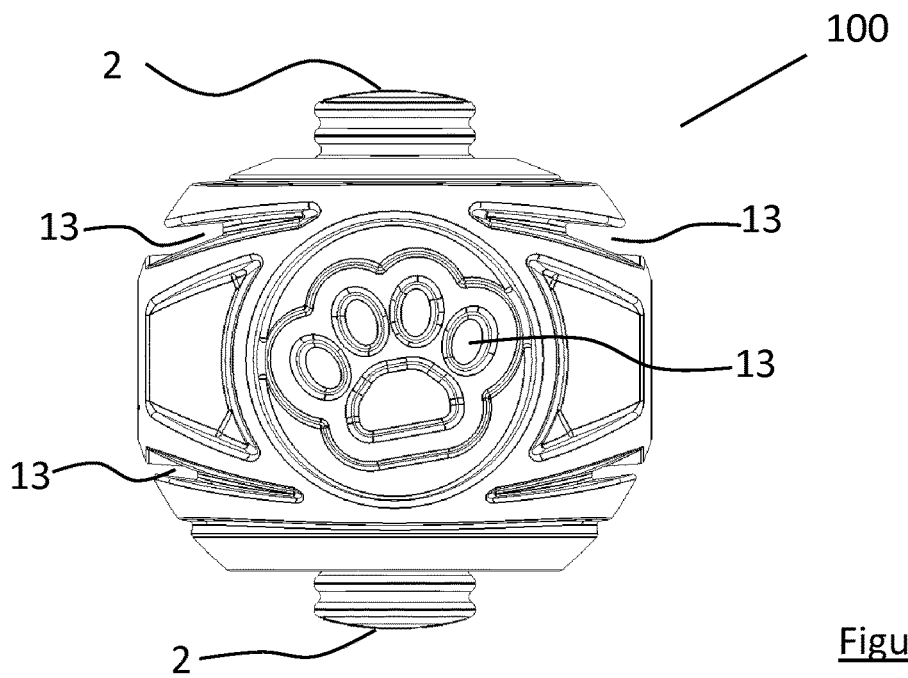
FIG. 4 is a front view of the main component of the modular dog toy.

Referring to FIG. 1, there is shown a modular dog toy indicated generally by the reference numeral 1 in a first configuration. The modular dog toy comprises three disparately sized and shaped components, namely a main component 100, a first auxiliary component 200 and a second auxiliary component 300. In the configuration shown there are provided two first auxiliary components 200 and two second auxiliary components 300.

The main component 100 is substantially spherical and has approximately twice the diameter of either of the auxiliary components. Being generally spherical and composed of resiliently deformable material, it will roll and bounce like a ball when not connected to the other components which on its own will provide entertainment for a dog. The auxiliary component 200 also has a substantially spherical shape and advantageously is so dimensioned that will enable it to fit into a tennis ball launcher. The auxiliary component 300 has a frustoconical shape.

Each of the components has a male connector 2 and a female connector 3 for engagement of the other components. The female connectors 3 comprise two inwardly depending flanges 9(a), 9(b) and the male connectors 2 comprise two complementary collars 11(a), 11(b). The flanges 9(a), 9(b) and collars 11(a), 11(b) enable the connectors to connect at two different depths, allowing the owner to modify the difficulty of separating the components for the dog. For example, if the male connector is partially inserted into the female connector by a depth sufficient to cause the outermost collar 11(a) to engage the outermost flange 9(a) on the female connector, the connection between the two components will be relatively weak. This would be suitable for small or elderly animals as the degree of difficulty would be relatively low. If the male connection is inserted further into the female connector to a point where the outermost collar 11(a) on the male connector engages the innermost flange 9(b) on the female connector and the innermost collar 11(b) on the male connector engages the outermost flange 9(a) on the female connector, the connection between the two components would be relatively strong. This would be suitable for larger or stronger animals as the degree of difficulty would be relatively high.

The main component 100 has a plurality of connectors arranged about its surface which allows for many configurations of auxiliary components around the main component.

Each component 100, 200, 300 has an internal cavity 5 for the reception of foodstuff which is accessible through an aperture 7. In some instances the aperture 7 may comprise an unconnected female connector on an auxiliary component, as shown on the first auxiliary component 200 in FIG. 1 connected directly to the main component 100. In other cases the aperture 7 is formed in the side or bottom of the component. The internal cavity 5 of the main component 100 is dimensioned to enclose a substantial meal for a dog. The internal cavities of the auxiliary components may hold treats for a dog. There are also recesses 13 on the outside of the components which are not connected to the internal cavity 5. It is envisaged that the recesses 13 could contain small pieces of foodstuff for a dog, for example kibble or peanut butter. The recesses also provide places for dogs to grip the components.

In the configuration shown in FIG. 1 the modular dog toy is shown resting on its side. There is an auxiliary component 300 attached to the top of the main component 100 via the female connector of the auxiliary component 300 and a male connector of the main component 100. The charging aperture of the main component 100 is on the side of the main component opposite the male connector that is shown connected to the auxiliary component 300. This means that in order to get food out of the main component, a dog will have to stand the modular dog toy upright, which is relatively difficult owing to the instability of such a position.

Referring now to FIG. 2, there is shown a part of the configuration of the modular dog toy 1 shown in FIG. 1 in which the main component 100 and one of the auxiliary components 200 have been removed. There is shown an auxiliary component 200 and two other auxiliary components 300. In this configuration, the dog will try to separate the three remaining components. This will be quite challenging as it is difficult to get leverage on the smaller components.

Referring now to FIG. 3, there is shown an alternative configuration of the modular dog toy 1 comprising a main component 100, two auxiliary components 200 and another auxiliary component 300. In this configuration it is clear that the toy will be more easily moved to its upright position in order to make food fall out of the main component than in configuration shown in FIG. 1.

Referring now to FIGS. 4 to 18 inclusive, there are shown a number of views of the individual components 100, 200, 300 of the dog toy. The components 100, 200, 300 are not shown to scale in the drawings and it will be appreciated that in practice the main component 100 shown in FIGS. 4 to 8 inclusive will have a diameter of approximately twice that of either of the auxiliary components 200, 300.

Referring, first of all, to FIGS. 4 to 8 inclusive, there is shown the main component 100 having a pair of male connectors 2 each having two collars 11(*a*), 11(*b*), a pair of female connectors 3 each having inwardly depending flanges 9(*a*), 9(*b*), an internal cavity 5, and a plurality of recesses 13. It can be seen that in this embodiment the recesses 13 and the female connectors 3 are not in communication with the internal cavity 5. However, it is envisaged that a female connector could open to the internal cavity 5. In this embodiment there are shown two female connectors 3 and two male connectors 2 spaced apart on the main component 100. However, various different combinations and numbers of connectors are envisaged.

Figure 5:
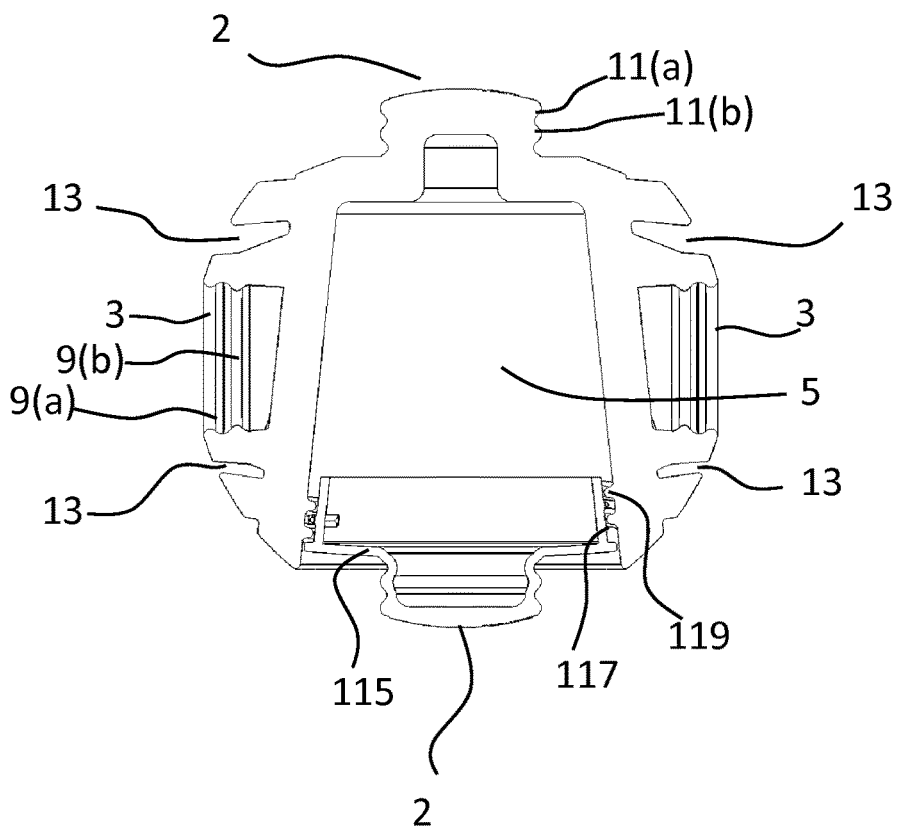
FIG. 5 is a front cross sectional view of the main component.
Figure 6:
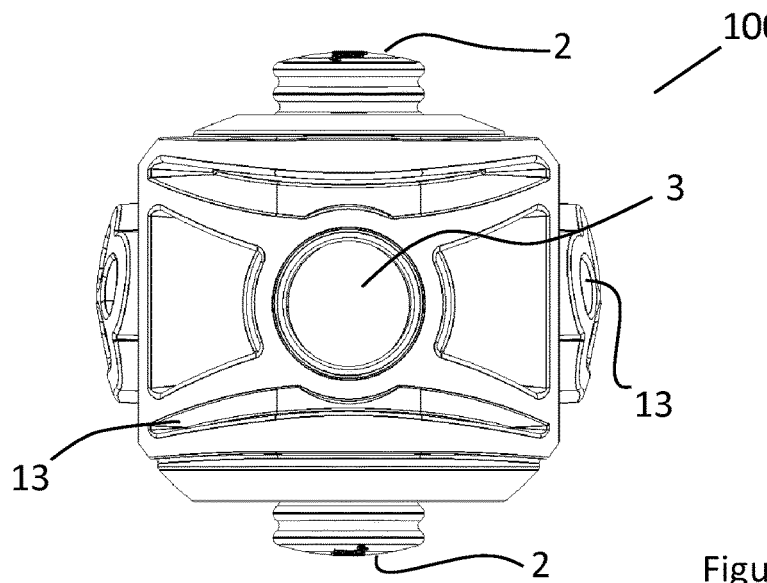
FIG. 6 is a side view of the main component.
Figure 7:
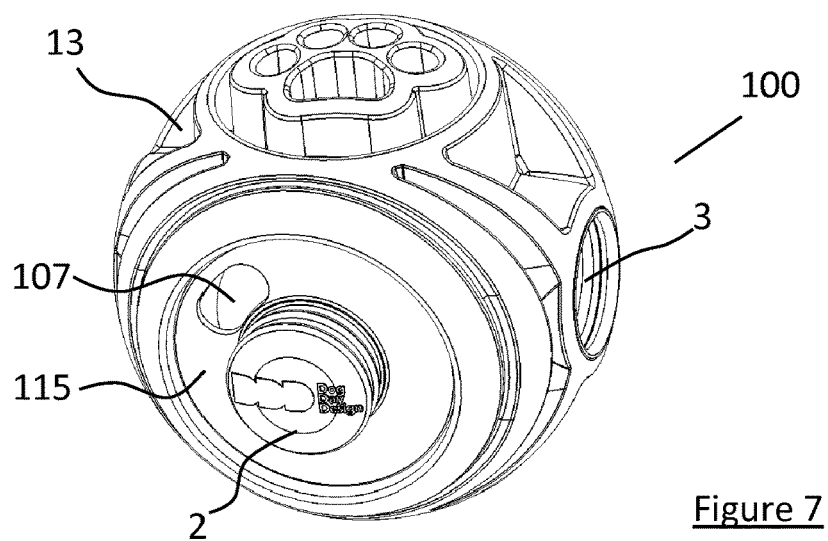
FIG. 7 is a bottom perspective view of the main component.
Figure 8:
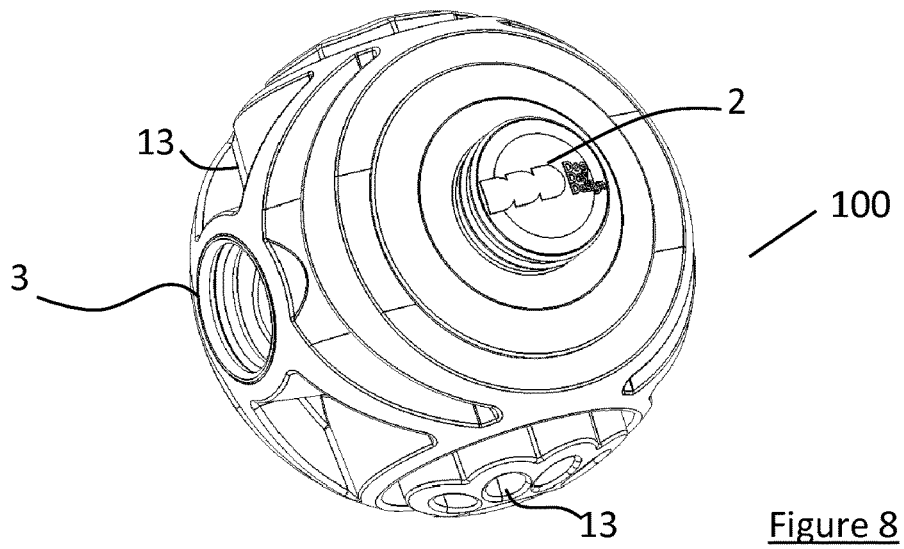
FIG. 8 is a top perspective view of the main component.
Figure 9:
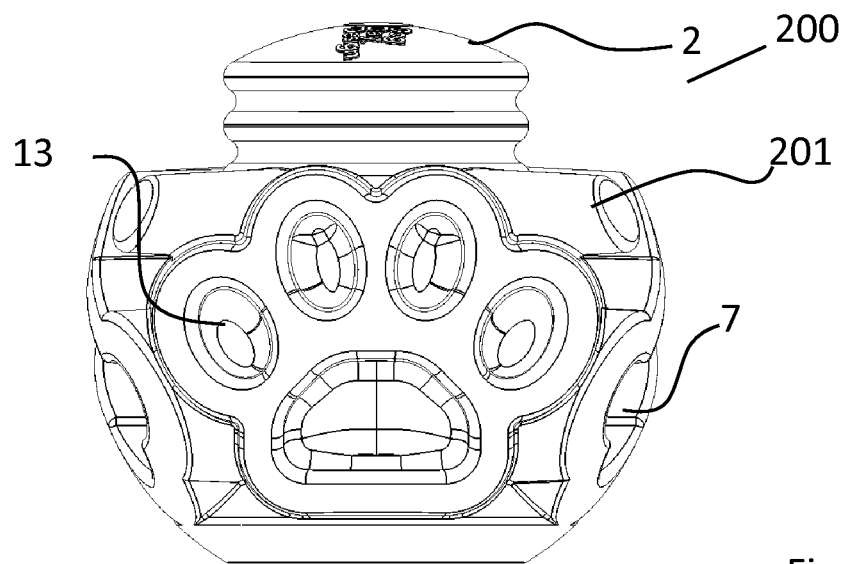
FIG. 9 is a front view of a first auxiliary component of the modular dog toy.
Figure 10:
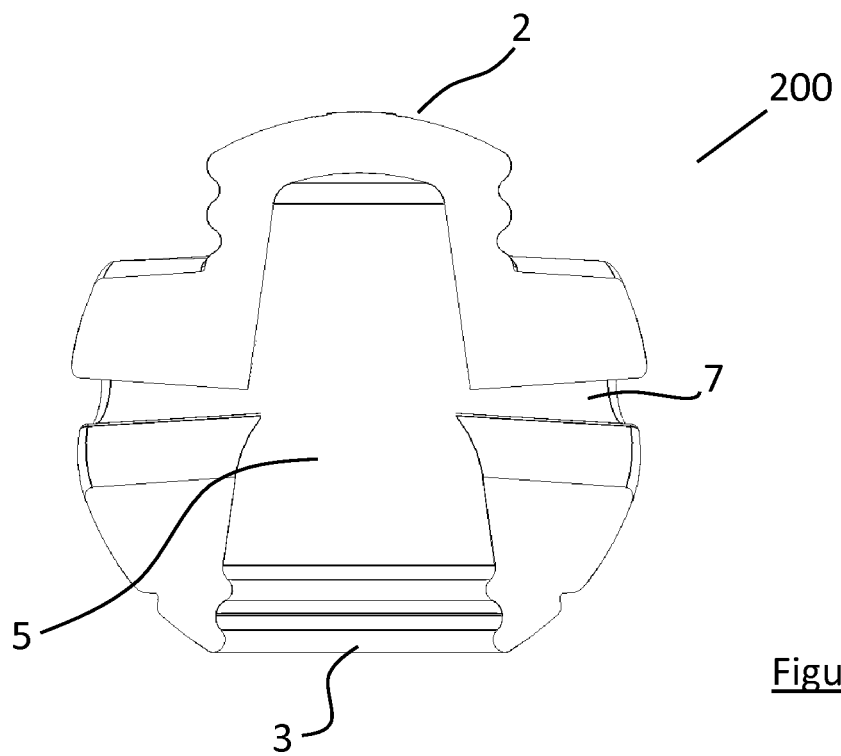
FIG. 10 is a front cross sectional view of the auxiliary component of FIG. 9.
Figure 11:
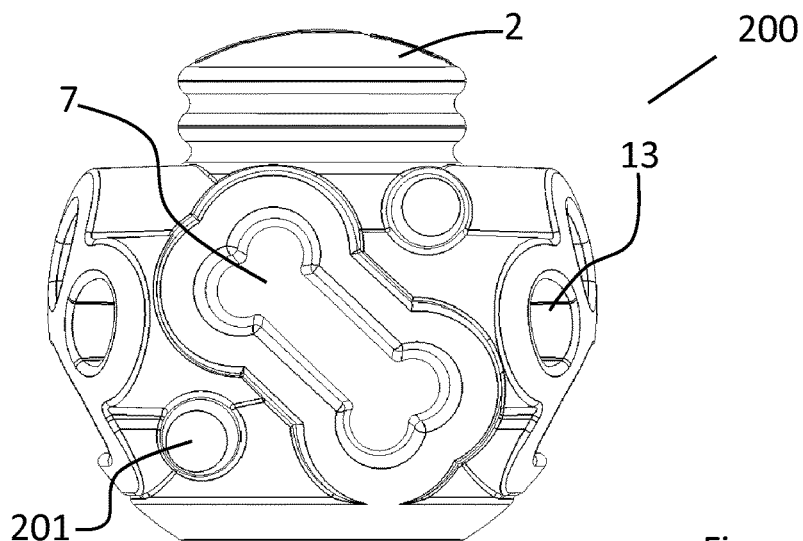
FIG. 11 is a side view of the auxiliary component of FIG. 9.
Figure 12:
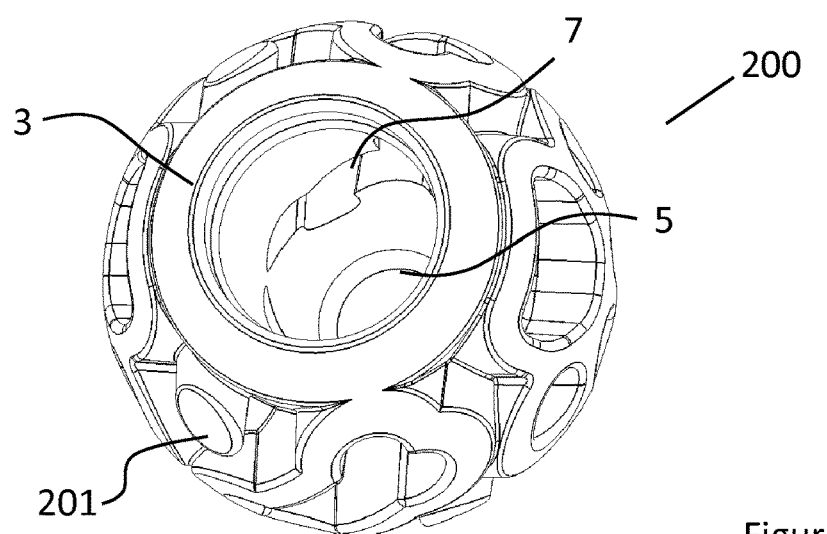
FIG. 12 is a bottom perspective of the auxiliary component of FIG. 9.
Figure 13:
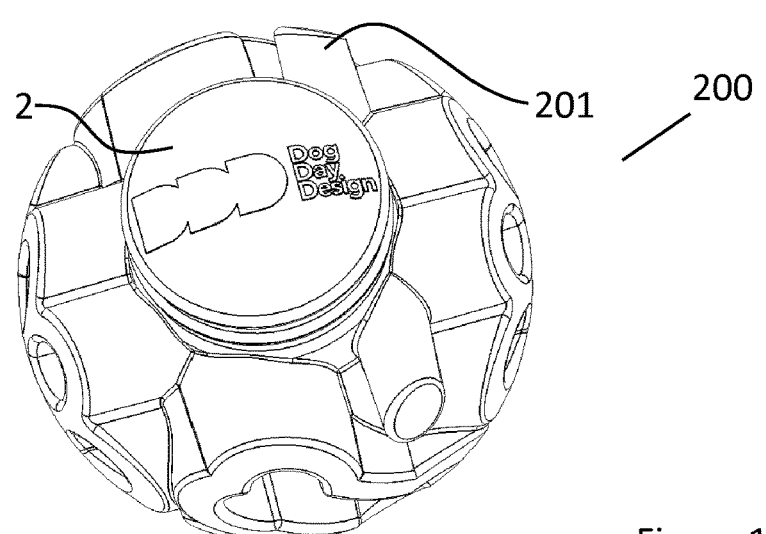
FIG. 13 is a top perspective view of the auxiliary component of FIG. 9.
Figure 14:
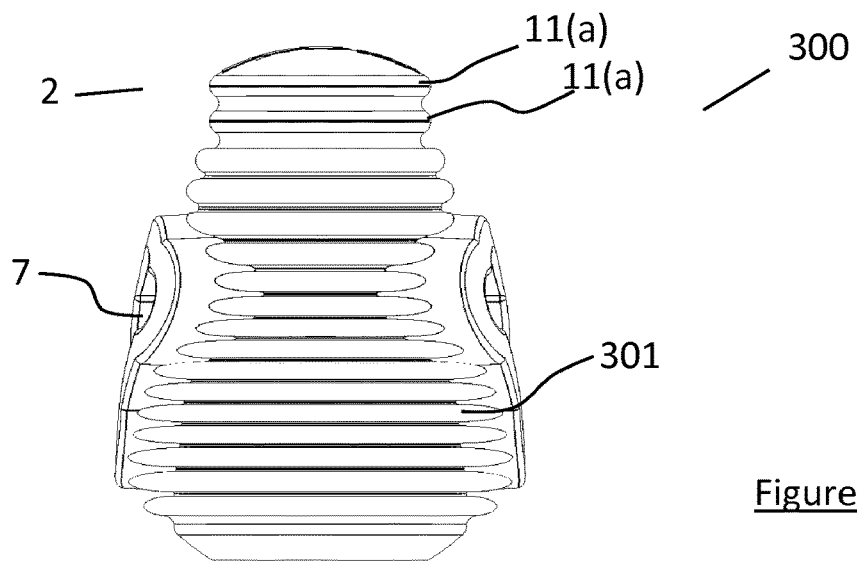
FIG. 14 is a front view of a second auxiliary component of the modular dog toy.
Figure 15:
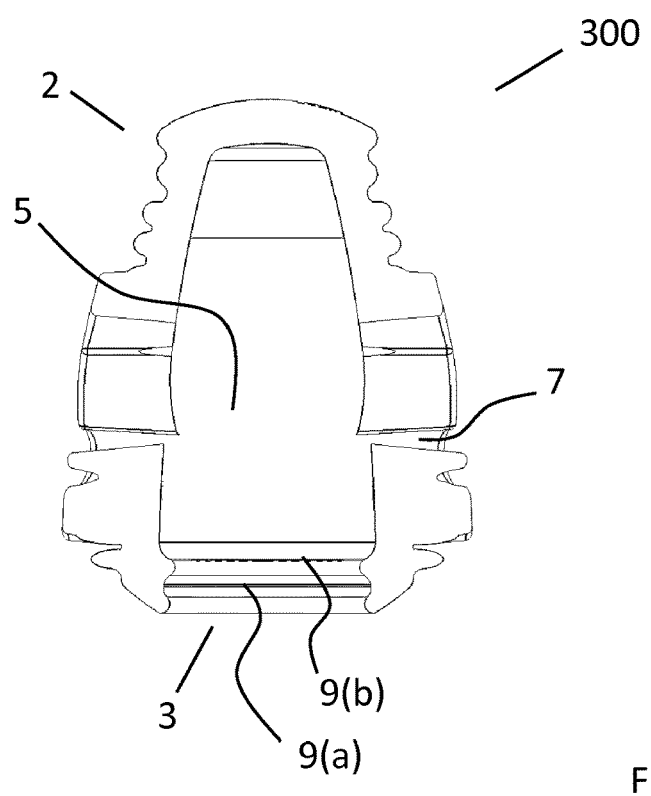
FIG. 15 is a front cross sectional view of the auxiliary component of FIG. 14.
Figure 16:
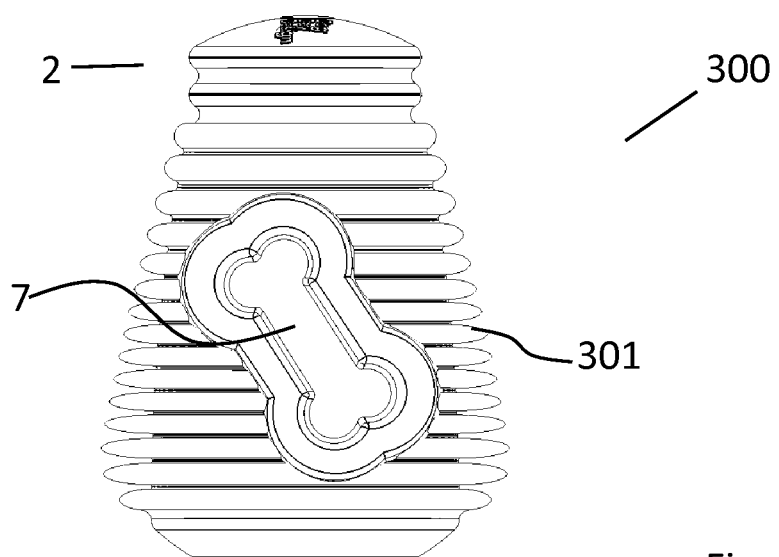
FIG. 16 is a side view of the auxiliary component of FIG. 14.
Figure 17:
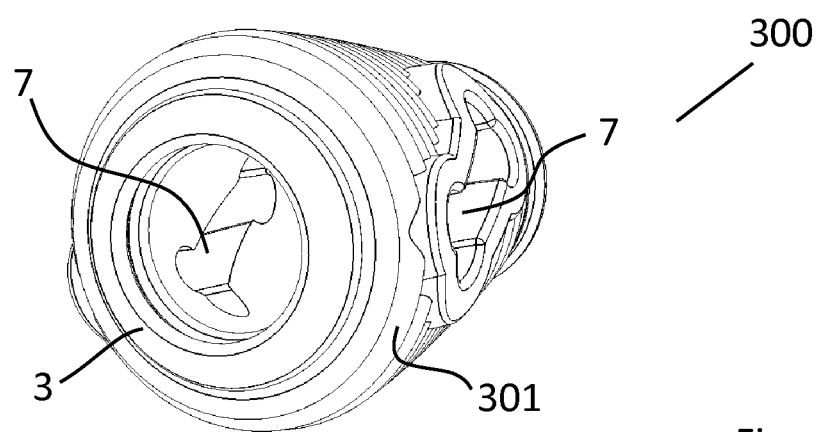
FIG. 17 is a bottom perspective of the auxiliary component of FIG. 14.
Figure 18:
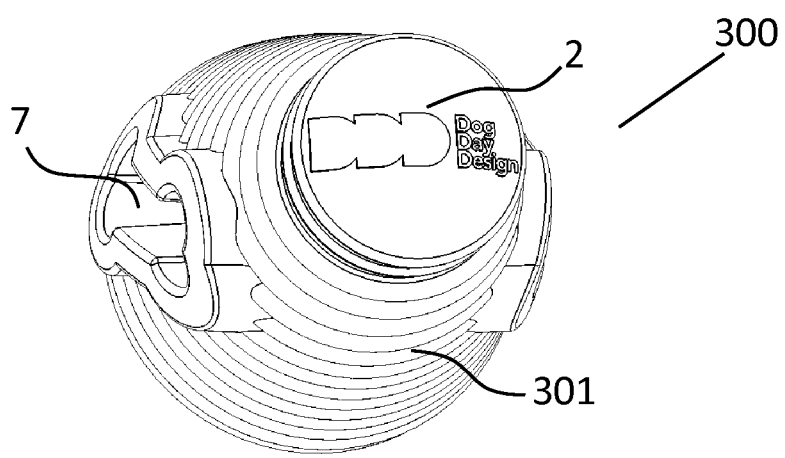
FIG. 18 is a top perspective view of the auxiliary component of FIG. 14.

Referring now specifically to FIGS. 5 and 7, there is shown a detachable lid 115 on the bottom face of the main component 100. The lid has a helical thread 117 complementary to a helical thread 119 on the main body of the main component 100. This detachable lid provides an easy way to fill the internal cavity 5 of the main component 100 with foodstuff. It is envisaged that a dog would not be able to remove this lid with ease. The detachable lid 115 also enables cleaning of the inside of the main component 100. In this embodiment there is a male connector 2 on the detachable lid. This makes the toy particularly unstable when it is upright which increases the difficulty for the dog. However, it is envisaged that a lid could be provided with no connector or with a female connector instead of the male connector. Indeed, as the lid is a separate piece, it is envisaged that several lids could be available and the difficulty could be tailored to the specific dog. There is an aperture 107 on the detachable lid 115. This aperture allows food to fall out of the main component when the main component is turned upright. It is envisaged that the aperture could have an adjustable size for increasing or decreasing the difficulty of obtaining food and to allow for different sized foodstuffs. It is also envisaged that lids with different sized apertures could be provided. The aperture also provides a finger hole for the owner to unscrew the detachable lid. However, it is not essential that the aperture and lid are on the same face of the component, and other configurations are envisaged.

Referring now to FIGS. 9 to 13 inclusive, there is shown an auxiliary component of the modular dog toy, referred to generally by the numeral 200. The auxiliary component 200 has a male connector 2, a female connector 3, two apertures 7, a plurality of recesses 13 and four bosses 201. The female connector 3 opens into the internal cavity 5. Thus if a large piece of food is placed inside the auxiliary component 200 and the female connector 3 is used to engage another component, the dog will have to disconnect the two components to obtain the food. The female connector open to the internal cavity 5 also allows the inside of the auxiliary component to be cleaned more easily, for example in a dishwasher. The apertures 7 will allow kibble and other small pieces of food to fall out. The component 200 has a boss 201 which is dimensioned so that a small dog can pick up and carry the component in its mouth. The auxiliary component 200 can fit into a tennis ball launcher for a game of fetch with the dog.

The auxiliary component 200 is substantially spherically shaped and by this what is meant is that the auxiliary component is akin to a sphere with portions of its surface gouged out and if encased in a sphere, a large portion of the surface of the auxiliary shape including the remote surface of the male connector would be in contact with the sphere. Put another way, if the curvature of the sides of the auxiliary component (for example in FIG. 9) were continued upwards towards the male connector 2, the sides would meet with the male connector to form a substantially smooth surface of a hemisphere. If the curvature of the sides of the auxiliary component were also continued downwards to encase the female connector, the resulting shape formed by the unitary surface would effectively be a sphere.

Referring now to FIGS. 14 to 18 inclusive, there is shown another auxiliary component of the modular dog toy, referred to generally by the numeral 300. The auxiliary component 300 has a male connector 2, a female connector 3 and two apertures 7. The female connector 3 opens into the internal cavity 5. Thus if a large piece of food is placed inside the component 300 and the female connector 3 is used to engage another component, the dog will have to disconnect the components to obtain the food. The female connector open to the internal cavity 5 also allows the inside of the component to be cleaned more easily. The apertures 7 will allow kibble and other small pieces of food to fall out. The auxiliary pieces 300 have ribs 301 which will massage the gums of a dog and help clean their teeth.

It will be understood that owing to the complementary connectors on each component, a wide variety of configurations with varying numbers of the disparate components of the modular dog toy are possible. It is envisaged that the components could be sold separately to allow an owner to make a configuration most suited to a particular dog.

Figure 19:
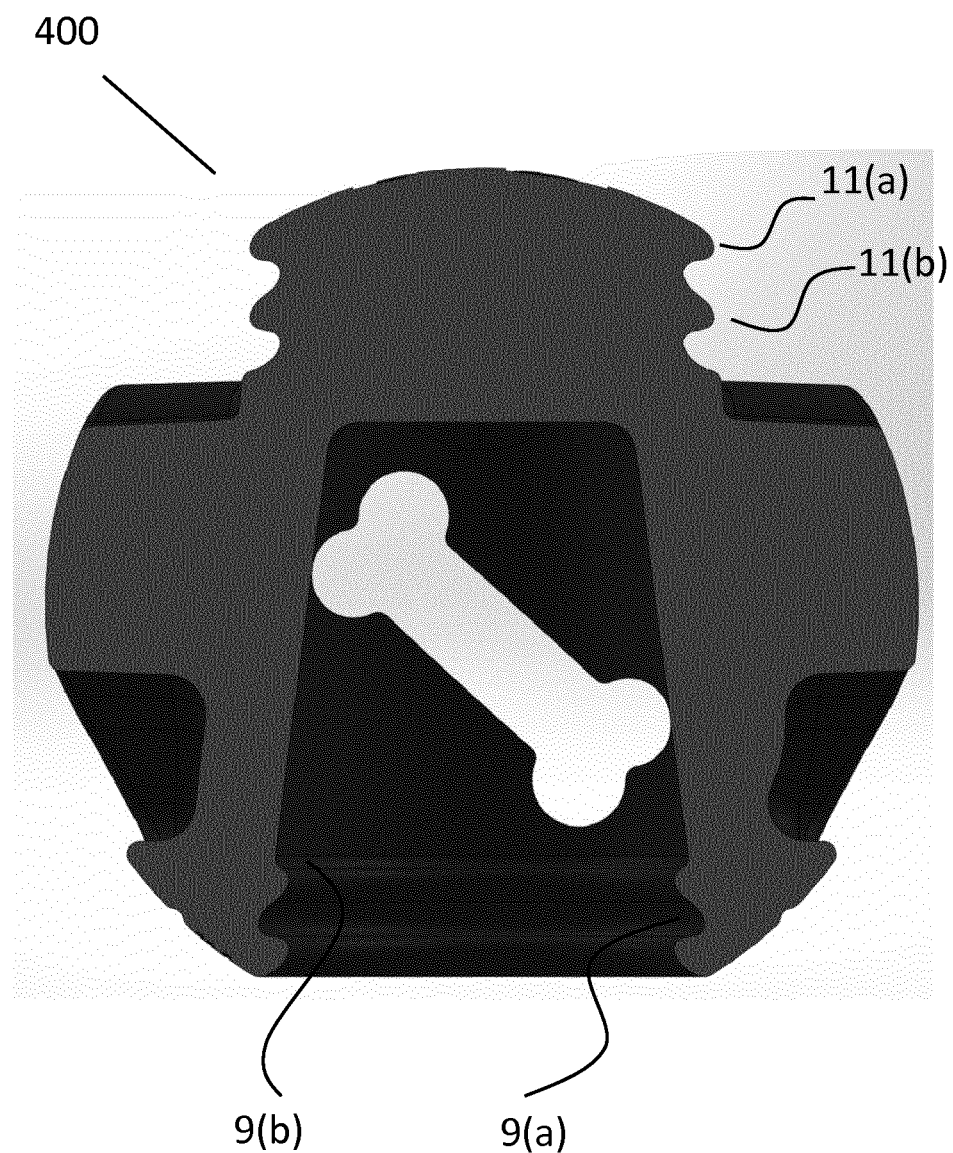
FIG. 19 is a side cross-sectional view of a third auxiliary component.
Figure 20:
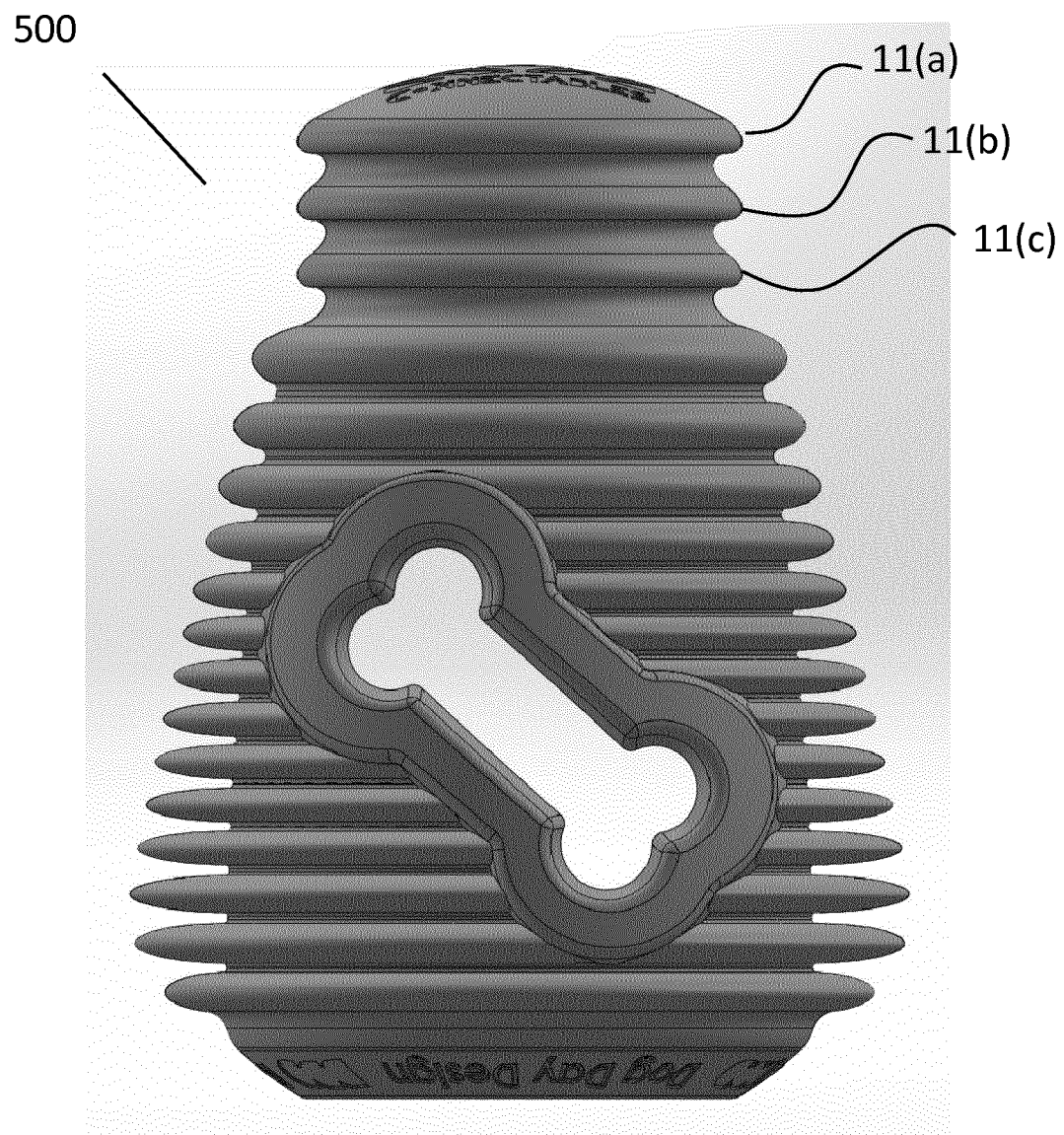
FIG. 20 is a side view of a fourth auxiliary component.
Figure 21:
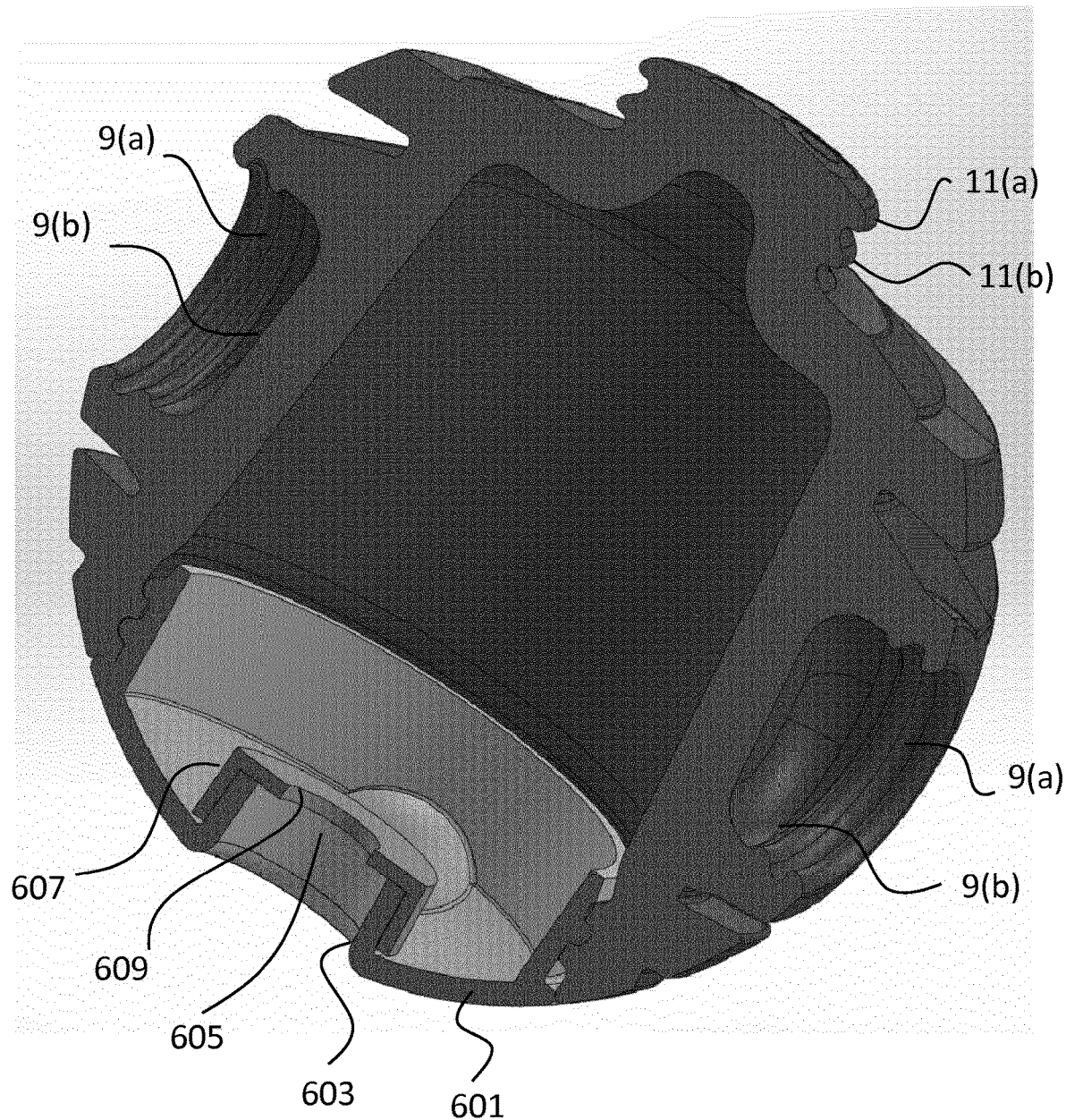
FIG. 21 is a perspective cross-sectional view of an alternative embodiment of main component.

Referring now to FIGS. 19 to 21 inclusive, there is shown a third auxiliary component 400, a fourth auxiliary component 500 and a second main component 600, where like parts have been given the same reference numerals as before. Each of the components 400, 500 and 600 in that the complimentary connectors are arranged to facilitate insertion of the male connector into the female connector and provide greater resistance against withdrawal of the male connector from the female connector. This is achieved by having a saw-toothed shaped inwardly depending flanges 9(*a*), 9(*b*) and saw-toothed shaped collars 11(*a*), 11(*b*).

By saw-toothed, what is meant is that the inwardly depending flanges and the collars are each effectively shaped like a sharks fin with a gradually inclined front or leading surface and a steeper, more abrupt trailing surface, the leading and trailing surfaces being considered from the point of view of the male connector being inserted into the female connector. These gradually inclined leading surfaces on the collars and the flanges will facilitate the insertion of the male connectors into the female connectors. However, once inserted, the more abrupt trailing surfaces on the collars and the flanges will work together to prevent release of the male connector from the female connector. The trailing surfaces may be substantially perpendicular to the main axis of the connector or offset to the perpendicular. It is envisaged that the trailing surfaces may even be angled in the direction towards the leading surface to "lock" with the trailing surface of a complementary connector.

Referring specifically to FIG. 19, it can be seen that the collars 11(*a*) and 11(*b*) are arranged so that they are angled backwards towards the centre of the third auxiliary component. Similarly, the inwardly depending flanges 9(*a*), 9(*b*) are also angled backwardly towards the centre of the third auxiliary component. It will be appreciated that this configuration will facilitate insertion of the male connector into a female connector of another auxiliary component and the female connector will act against withdrawal of a male connector of another auxiliary component.

Referring specifically to FIG. 20, it can be seen that the fourth auxiliary component 500 is provided with a third collar 11(*c*). It will be understood that this will enable the male connector to be pushed even further into a female connector thereby increasing the difficulty for the animal to separate the fourth auxiliary component from another auxiliary component or indeed the main component 600.

Referring specifically to FIG. 21, there is shown a cross-sectional view of the second main component 600. The second main component 600 differs from the first main component 100 of FIGS. 1 and 3 to 8 inclusive in that the second main component 600 has a lid 601 with an indent 603 surrounding the discharge aperture 605. There are two main advantages of providing such a construction. First of all, by having the indent surrounding the discharge aperture 605, as the food falls out of the discharge aperture as the main component is rolled along the ground, the main component will not crush the food. Secondly, by having the indent 603 surrounding the discharge aperture 605, this enables the placement of an adjustable cap 607 or one of a plurality of different caps with differently-sized apertures 609 on the inner surface of the lid 601 to increase the challenge for the animal and/or to allow smaller kibble to be used in the main component.

Figure 22:
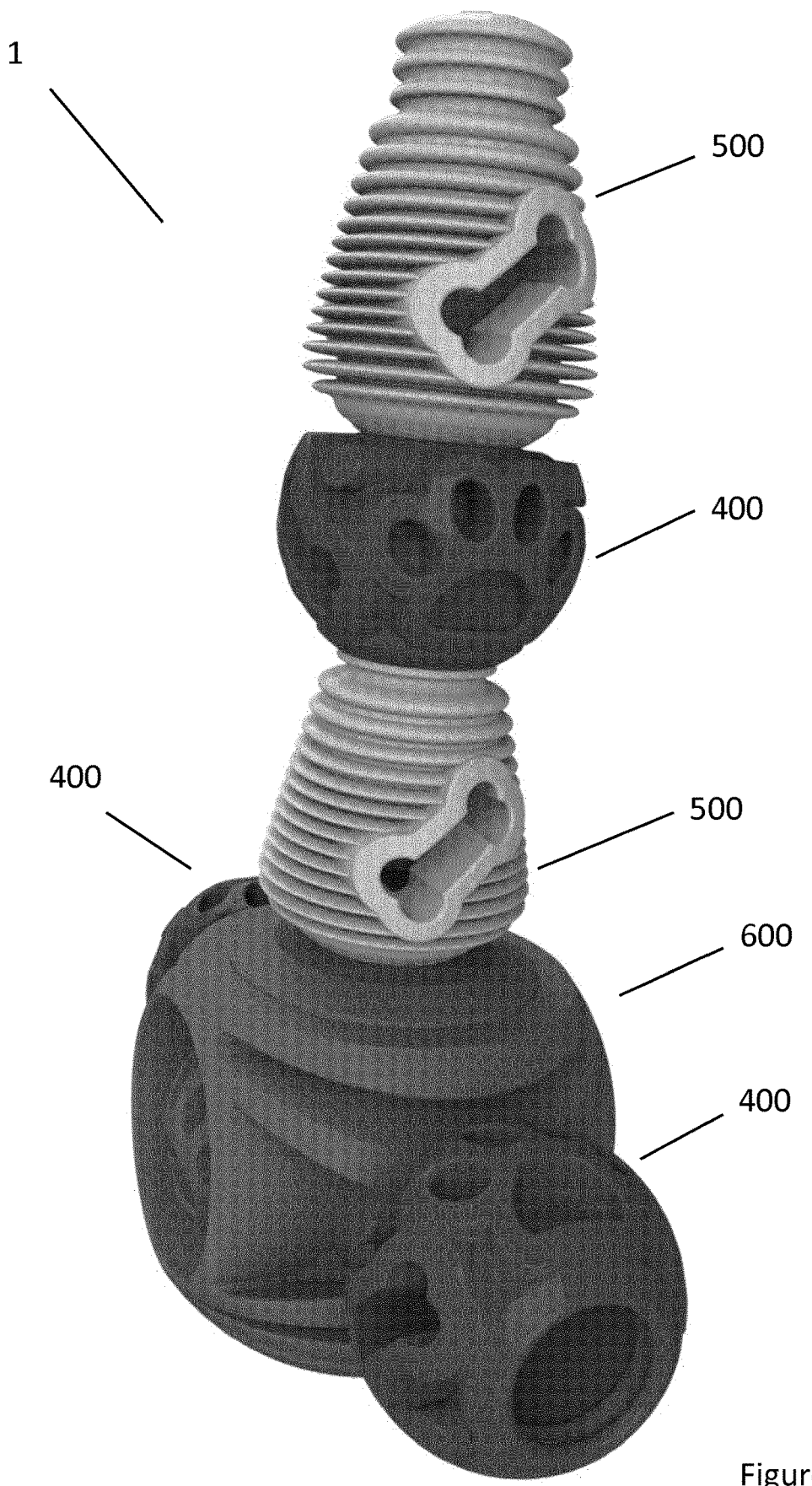
FIG. 22 is a perspective view of a modular dog toy according to the invention constructed with the components of FIGS. 19 to 21 inclusive.

Referring now to FIG. 22, there is shown a perspective view of the main component 600 and a plurality of the third auxiliary components 400 and the fourth auxiliary components 500 connected together in a modular dog toy. It will be understood that the configuration shown is merely illustrative of one of a number of different configurations that could be implemented with the components shown.

Figure 23:
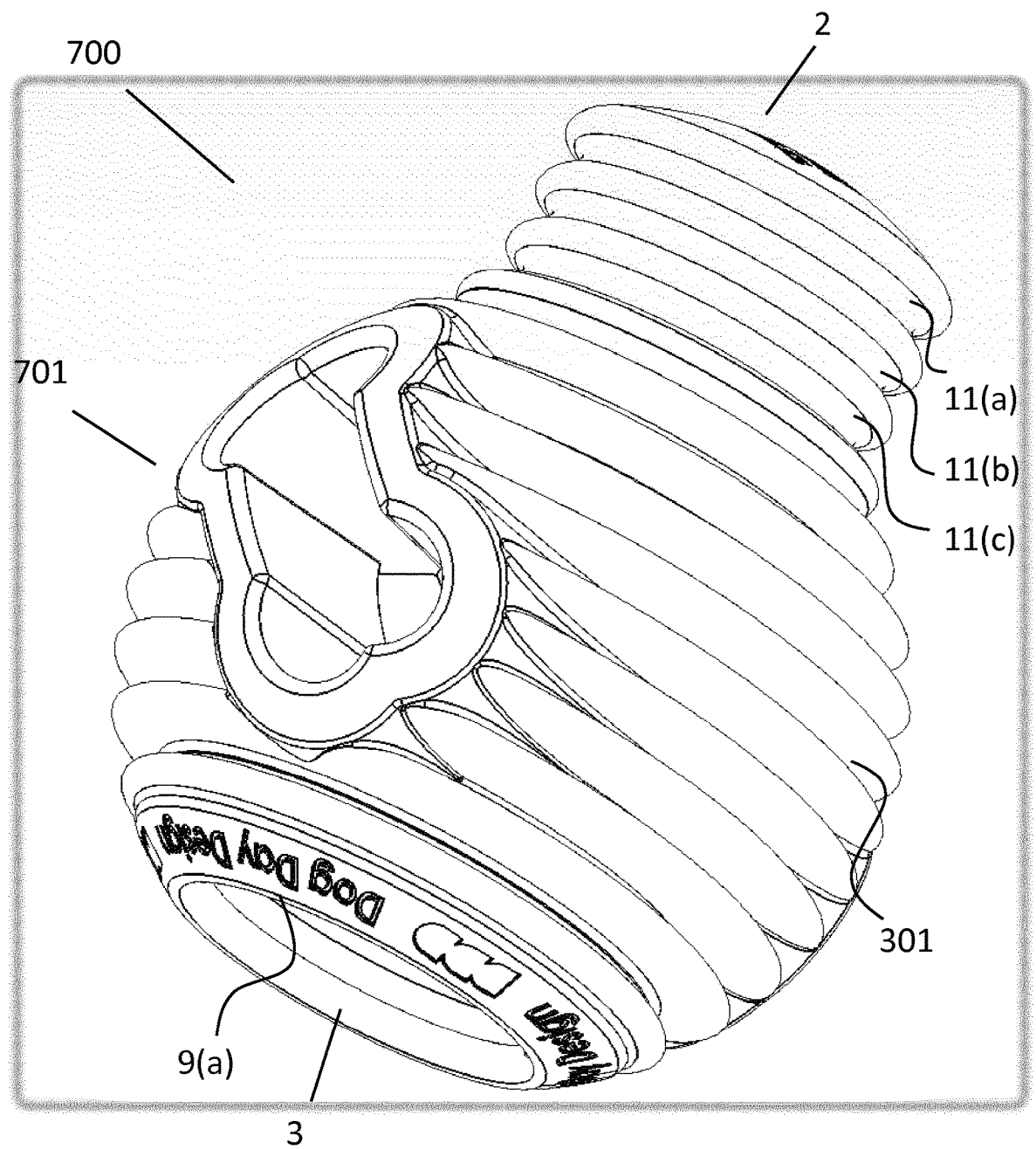
FIG. 23 is a perspective view of a fifth auxiliary component.
Figure 24:
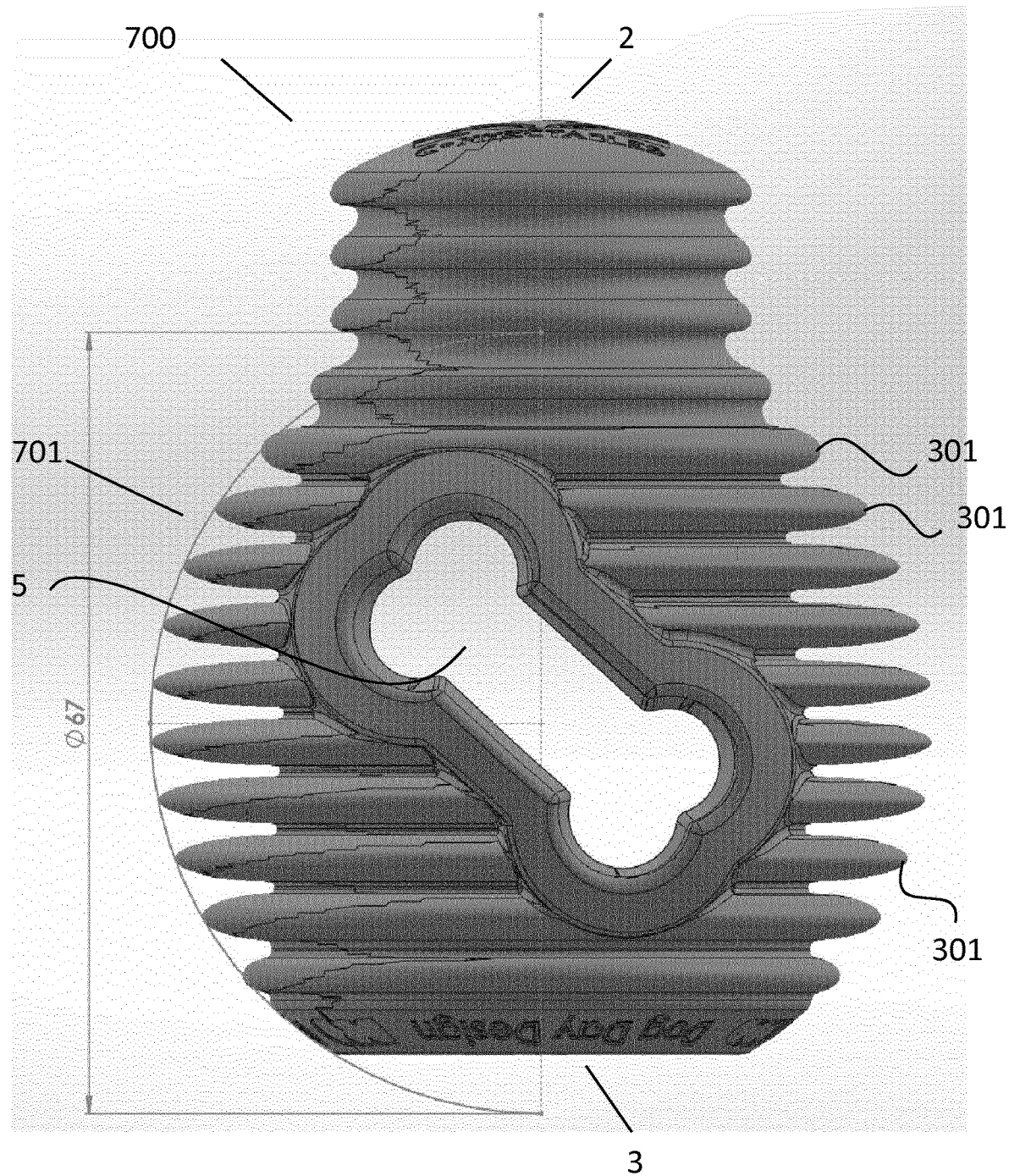
FIG. 24 is a side view of the fifth auxiliary component shown in FIG. 23.

Referring now to FIGS. 23 and 24, there is shown a fifth auxiliary component, indicated generally by the reference numeral 700. The fifth auxiliary component is similar to the second and fourth auxiliary components 300, 500 with the exception that it is in fact bulb-shaped with a substantially spherical portion 701, rather than being substantially frusto-conical in shape as before. The fifth auxiliary component 700 has a plurality of ribs 301 on its outer surface as before. Ideally, the substantially spherical portion 701 will fit inside a 67 mm (0.067 meter) diameter sphere (as illustrated in FIG. 24) and in this way, the fifth auxiliary component 700 can be used in a tennis ball launcher for use in launching of the component.

Figure 25:
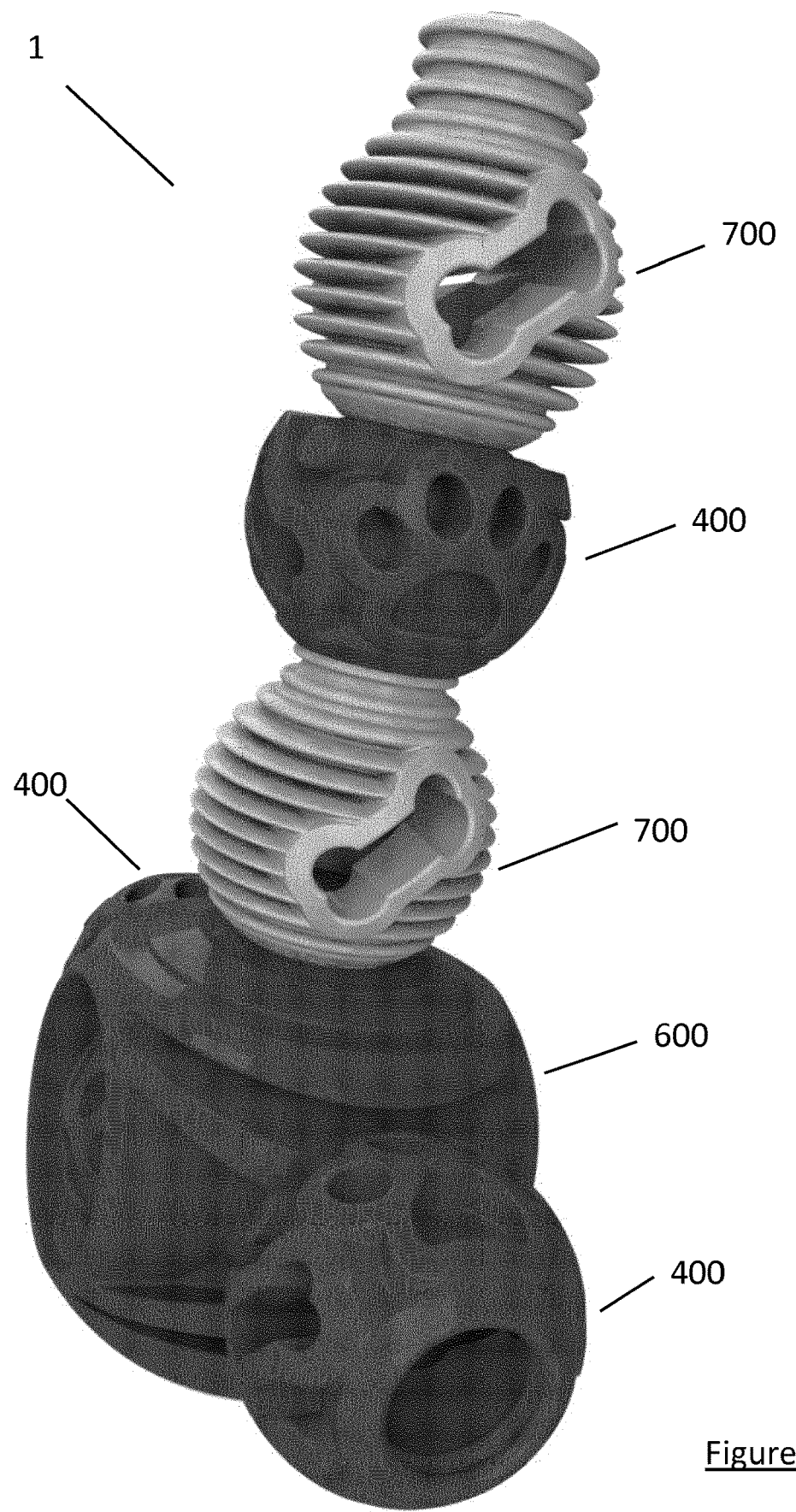
FIG. 25 is a perspective view of a modular dog toy according to the invention constructed with the components of FIGS. 19, 21 and 24.

Referring to FIG. 25, there is shown a perspective view of the main component 600 and a plurality of the third auxiliary components 400 and the fifth auxiliary components 700 connected together in a modular dog toy. It will be understood that the configuration shown is merely illustrative of one of a number of different configurations that could be implemented with the components shown.

Figure 26:
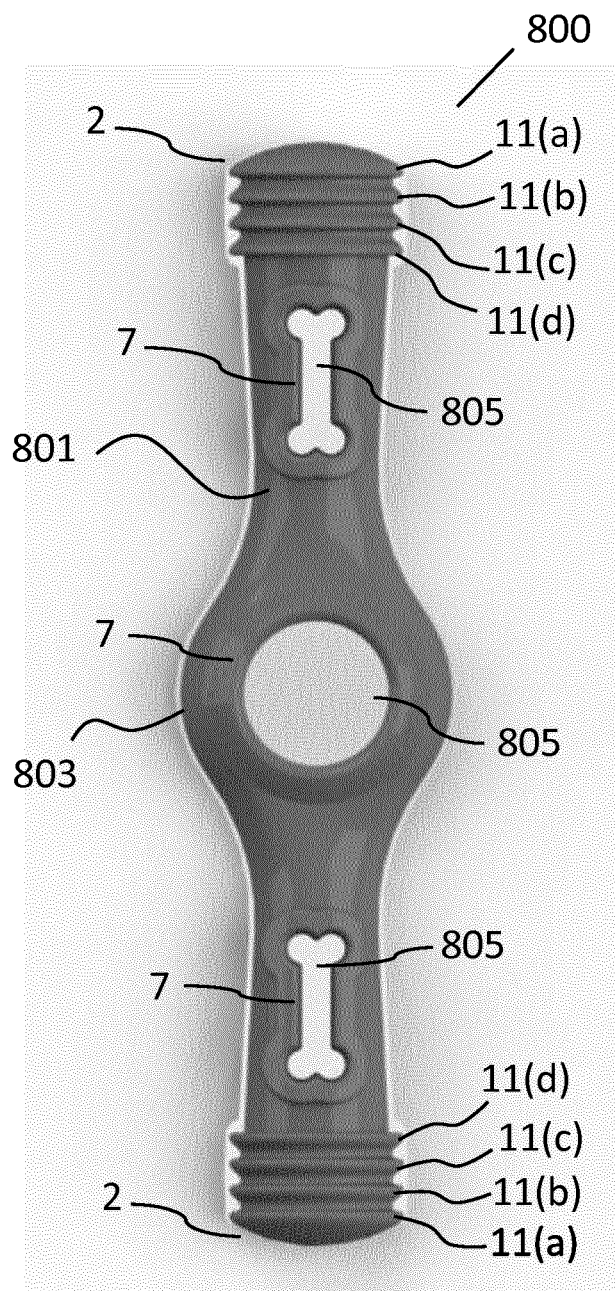
FIG. 26 is a front view of an alternative embodiment of the main component.

Referring now to FIGS. 26 to 29 inclusive, there is shown alternative arrangements of the modular dog toy of the invention, where like parts have been given the same reference numerals as before. Referring specifically to FIG. 26, there is shown a front view of an alternative embodiment of the main component, indicated generally by reference numeral 800. The main component 800 has a body 801 that is elongate and substantially cylindrical in shape, having a male connector 2 at each end and a pair of female connectors 3 located back to back in a bulge 803 having a through-bore 805 intermediate the ends of the component. It can be seen that the male connectors are each provided with four collars (11(*a*)-11(*d*)). It will be understood that this will enable the male connector to be pushed even further into a female connector in order to increase the difficulty for the animal to separate an auxiliary component from the main component 800. The main component 800 is provided with a plurality of apertures 7 intermediate the ends of the component, thereby allowing pieces of food to be inserted for the animal to remove. By having two female connectors back to back in the bulge 803, it is envisaged that a small amount of food such as kibble or the like could be inserted into the centre of the component, and the male connectors of a pair of auxiliary components could be inserted into each of the female connectors in order to increase the difficulty for the animal to reach the food. It is envisaged that the body 801 could be at least partially hollow to allow more food to be stored therein for the dog.

Figure 27:
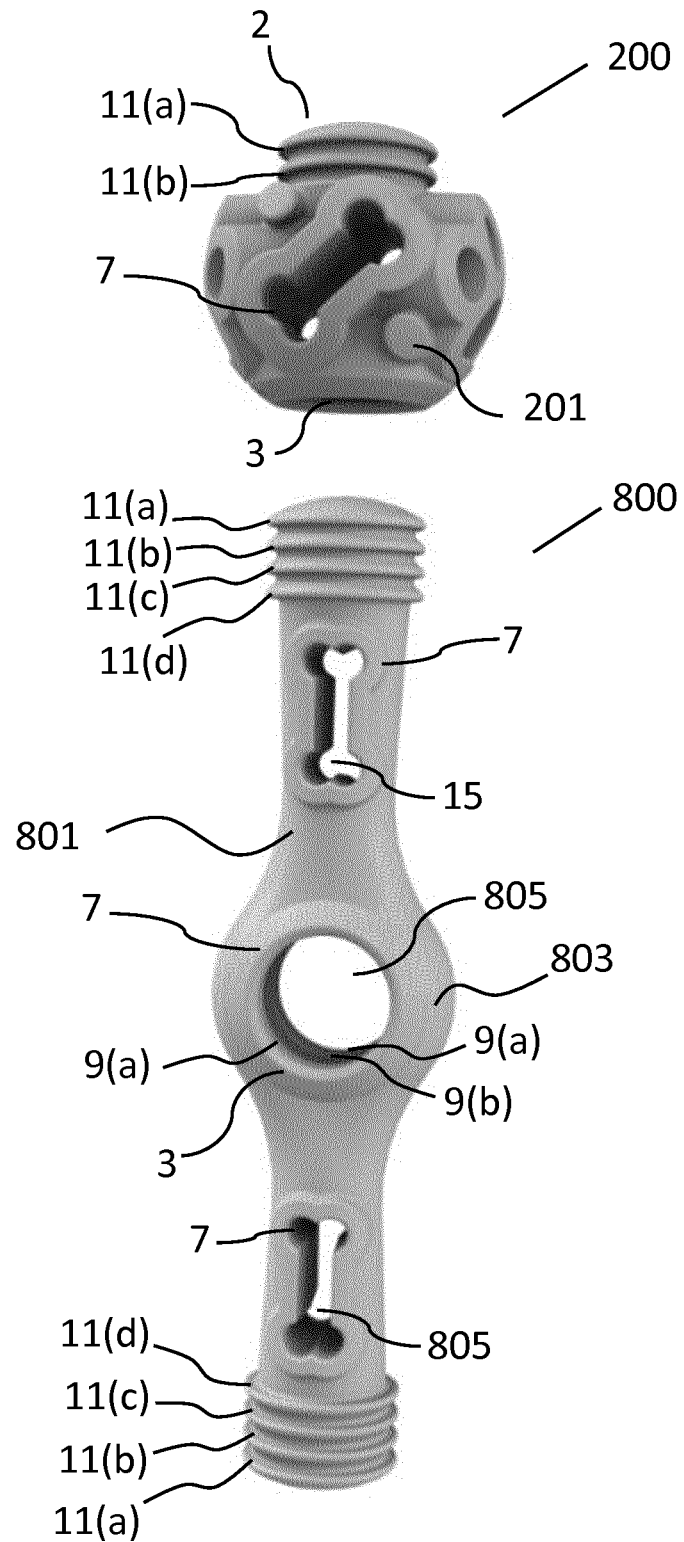
FIG. 27 is an exploded perspective view of an alternative embodiment of the main component and the first auxiliary component of FIGS. 9 to 13.
Figure 28:
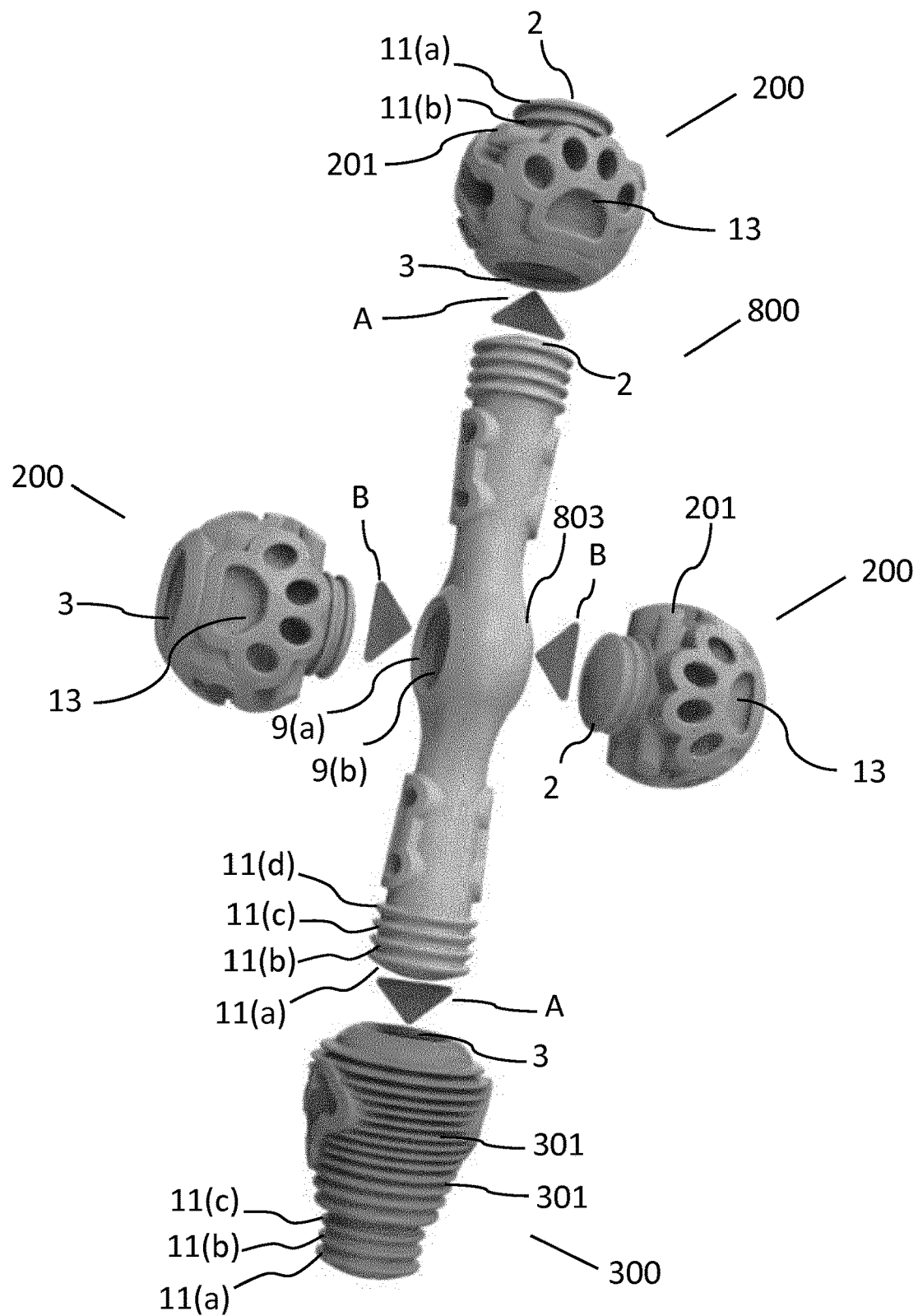
FIG. 28 is an exploded perspective view of a modular dog toy according to the invention constructed with the components of FIGS. 9, 14 and 26.

Referring now to FIG. 27 there is shown an exploded view of the main component 800 and an auxiliary component 200. It is envisaged that the top male connector 2 of the main component 800 could be inserted into the female connector 3 of the auxiliary component 200 to varying depths in order to increase the difficulty level for the animal. Referring to FIG. 28 there is shown an exploded perspective view of a possible arrangement of the modular dog toy according to the invention, constructed with a plurality of the first auxiliary components 200 and one second auxiliary component 300. Arrows "A" located at the top and bottom of the main component 800 indicate the direction of insertion of the male connectors 2 of the main component 800 with the female connectors of the auxiliary components 200 and 300. Arrows "B" located either side of the bulge 14 indicate the direction of insertion of the male connectors 2 of a pair of auxiliary components 200 with the back to back female connectors 3 of the main component 800.

Figure 29:
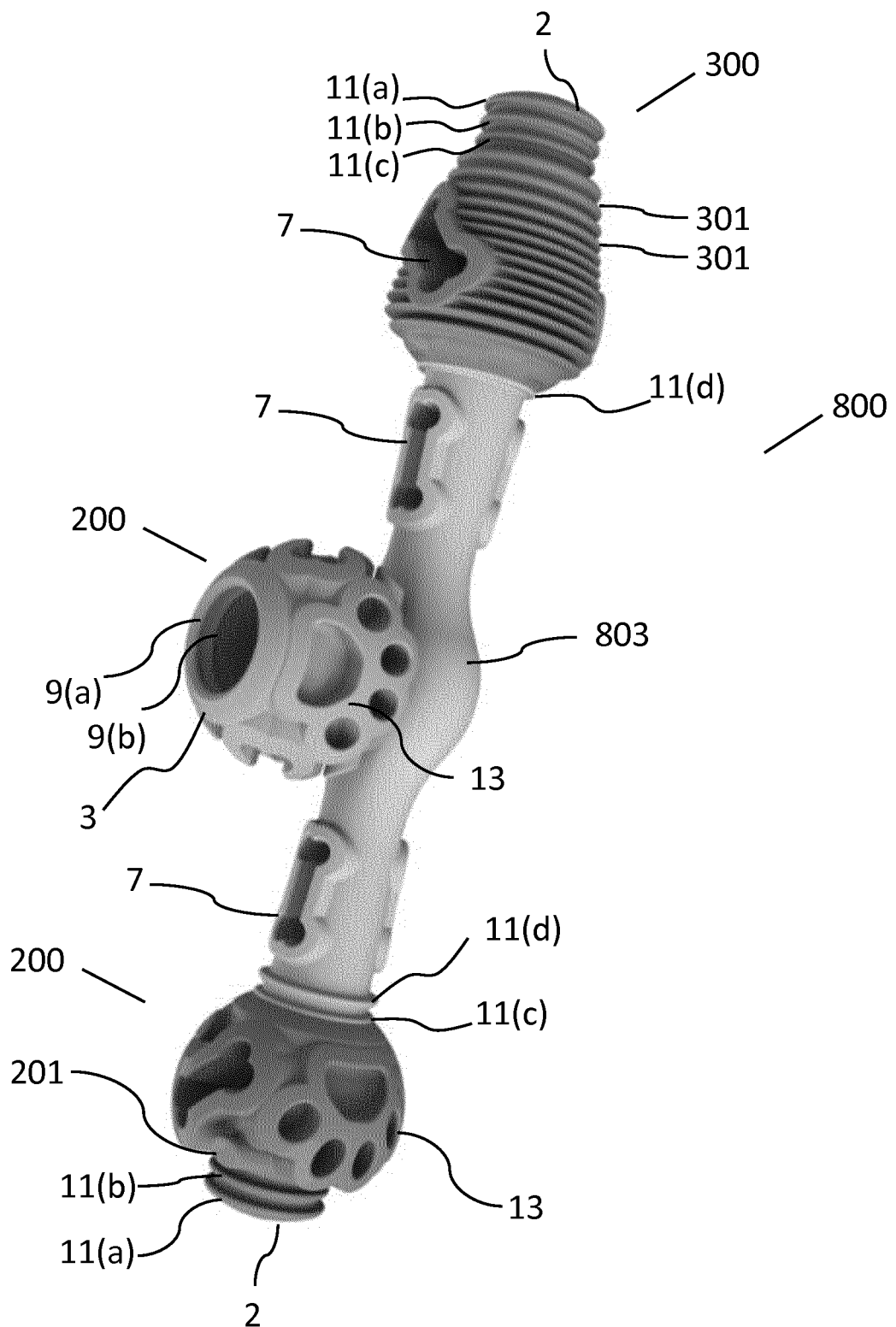
FIG. 29 is a perspective view of the modular dog toy according to the invention constructed with the components of FIGS. 9, 14 and 26 connected together.

Referring to FIG. 29, there is shown a possible configuration of the modular dog toy of the invention. There is an auxiliary component 300 attached to the top of the main component 800 via the female connector of the auxiliary component 300 and a male connector of the main component. Collars 11(*a*)-11(*c*) inclusive are pushed into the flanges (not shown) of the female connector of the auxiliary component 300, making it more difficult for an animal to separate the two components. There is an auxiliary component 200 attached to the bottom of the main component 800 via the female connector of the auxiliary component 200 and a male connector of the main component. Collars 11(*a*) and 11(*b*) inclusive are pushed into the flanges (not shown) of the female connector of the auxiliary component 200, indicating that it would be slightly easier for an animal to separate these two components compared to separating the component 300 at the top of the main component 800 from the main component 800. Finally, there is an auxiliary component 200 attached to the aperture of the main component 800 via the male connector of the auxiliary component 200 and one of the female connectors of the main component. By having such a configuration, it will be understood that the toy will be more difficult to roll, making it easier for the animal to separate the components.

It is envisaged that the components of the modular dog toy will have a shore A hardness of between 60 and 75. This is a range of hardness which is suitable for both small dogs and large dogs. By having such a range, the toy will be able to withstand prolonged chewing without itself or the dog's teeth or gums becoming damaged. By having a shore A hardness of 70 specifically, the toy will be sufficiently durable to present a challenge to both small and large dogs and ensure that the toy will not be easily destroyed by the dog. This shore A hardness will further ensure that the toy will not be too hard, thereby avoiding injury to the dog.

It is envisaged that other surface configurations could be provided on the surface of the main and auxiliary components. For example, the main component 800 or other components could be provided with a plurality of ribs 301 similar to those of auxiliary component 300. Furthermore, the auxiliary component 200 has a plurality of crevices and protrusions formed on its surface but different shapes, sizes, number and spacing of the protrusions and crevices are envisaged so that different toys may present different challenges and sensations for the dog.

In this specification the terms "comprise, comprises, comprised and comprising" and the terms "include, includes, included and including" are all deemed totally interchangeable and should be afforded the widest possible interpretation.

The invention is in no way limited to the embodiments hereinbefore described but may be varied in both construction and detail within the scope of the claims.

The invention claimed is:

1. A modular dog toy comprising three disparately sized and shaped components, each of these three components having a male connector and a female connector spaced apart about their surface for engagement of one of the other components, wherein the male connector comprises a plurality of collars surrounding the connector spaced apart from each other, the female connector comprises a plurality of inwardly depending flanges spaced apart from each other, and at least one of the plurality of collars and the plurality of inwardly depending flanges are saw-tooth shaped; and an internal cavity for reception of a foodstuff and a charging aperture in communication with the internal cavity for providing access to the cavity, wherein the female connector of at least a first of said three components opens into the internal cavity of the first component such that when the female connector is disconnected from the male connector of one of the other components, access to the internal cavity of the first component is provided therefrom, and wherein the three components comprise a main component and a pair of auxiliary components, the main component having at least one additional connector spaced apart from the other connectors about its surface.

2. A modular dog toy as claimed in claim 1 in which both of the plurality of collars and the plurality of inwardly depending flanges are saw-tooth shaped.

3. A modular dog toy as claimed in claim 1 in which one of the auxiliary components is substantially spherically shaped and has a diameter of between 0.065 m and 0.070 m.

4. A modular dog toy as claimed in claim 1 in which the substantially spherically shaped component has a diameter of the order of 0.067 m.

5. A modular dog toy as claimed in claim 1 in which the substantially spherically shaped auxiliary component has at least one recess formed in its surface.

6. A modular dog toy as claimed in claim 5 in which the recess defines an upstanding boss having dimensions smaller than the male connector.

7. A modular dog toy as claimed in claim 1 in which the main component is substantially spherically shaped and is of the order of twice the diameter of either of the auxiliary components.

8. A modular dog toy as claimed in claim 7 in which the main component has a detachable lid for insertion into the charging aperture, the detachable lid having a discharge aperture formed therein.

9. A modular dog toy as claimed in claim 7 in which the additional connector is orthogonal to at least one of the other connectors.

10. A modular dog toy as claimed in claim 1 in which the main component is elongate and substantially cylindrical in shape, having a male connector at each end, and in which a pair of female connectors are located back to back intermediate the ends of the component.

11. A modular dog toy as claimed in claim 10 in which the main component comprises at least one aperture intermediate the ends.

12. A modular dog toy as claimed in claim 11 in which the aperture comprises a through-bore.

13. A modular dog toy as claimed in claim 1 in which one of the auxiliary components is substantially frustoconical in shape.

14. A modular dog toy as claimed in claim 13 in which the frustoconically shaped auxiliary component has a ribbed surface.

15. A modular dog toy as claimed in claim 13 in which the base of the frustoconically shaped component comprises the female connector and the apex of the frustoconically shaped component comprises the male connector.

16. A modular dog toy as claimed in claim 1 in which one of the auxiliary components is bulb-shaped having a substantially spherical portion.

17. A modular dog toy as claimed in claim 1 in which the modular dog toy is constructed from one of a thermoplastic elastomer and a thermoplastic rubber.

18. A modular dog toy as claimed in claim 1 in which the modular dog toy has a shore A hardness of between 60 and 75.

19. A modular dog toy as claimed in claim 1 in which the modular dog toy has a shore A hardness of 70.

\* \* \* \* \*